United States Patent
Alvarez Dominguez et al.

(10) Patent No.: US 12,557,151 B2
(45) Date of Patent: Feb. 17, 2026

(54) IMPROVING CLASSIFICATION ACCURACY IN USER PLANE FUNCTION RE-SELECTION SCENARIOS

(71) Applicant: Telefonaktiebolaget LM Ericsson (publ), Stockholm (SE)

(72) Inventors: Rodrigo Alvarez Dominguez, Madrid (ES); Javier Muñoz Kirschberg, Madrid (ES); Carlos Jimenez Cordon, Madrid (ES); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 624 days.

(21) Appl. No.: 17/926,333

(22) PCT Filed: Aug. 26, 2020

(86) PCT No.: PCT/EP2020/073890
§ 371 (c)(1),
(2) Date: Nov. 18, 2022

(87) PCT Pub. No.: WO2021/233564
PCT Pub. Date: Nov. 25, 2021

(65) Prior Publication Data
US 2025/0274991 A1 Aug. 28, 2025

(30) Foreign Application Priority Data
May 19, 2020 (EP) .................................... 20382421

(51) Int. Cl.
*H04L 47/2441* (2022.01)
*H04L 47/2483* (2022.01)
(Continued)

(52) U.S. Cl.
CPC ............. *H04W 76/10* (2018.02); *H04W 8/22* (2013.01); *H04W 28/0268* (2013.01)

(58) Field of Classification Search
CPC .... H04W 76/10; H04W 8/22; H04W 28/0268
See application file for complete search history.

(56) References Cited

U.S. PATENT DOCUMENTS 10,448,268 B1 * 10/2019 Jaya ...................... H04W 76/19

FOREIGN PATENT DOCUMENTS

| WO | WO-2007087828 A1 * | 8/2007 | ........... H04L 47/808 |
| WO | 2019234481 A1 | 12/2019 | |
| WO | 2020001795 A1 | 1/2020 | |

OTHER PUBLICATIONS

International Search Report and Written Opinion of the International Searching Authority for PCT International Application No. PCT/EP2020/073890 dated Mar. 5, 2021.
(Continued)

*Primary Examiner* — Joseph E Dean, Jr.
(74) *Attorney, Agent, or Firm* — Sage Patent Group

(57) ABSTRACT

A method, UPF function/node, computer program, and computer program product to classify traffic of a user equipment, UE by a UPF is provided. A PFCP session establishment request comprising a session ID and a flow information profile is received. Responsive to the flow information profile indicating that flow information is to be stored for sessions by the UE, whether or not there is stored flow information for a session associated with the session ID is determined. UE application traffic is received, the UE application traffic including the session ID. Responsive to there being stored flow information for the session, the UE application traffic is classified based on the stored flow information. Responsive to there not being stored flow information for the session, the UE application traffic for a
(Continued)

corresponding packet detection rule of the session; is classified and flow information for the session based on the classifying is stored.

20 Claims, 12 Drawing Sheets

(51) Int. Cl.
*H04W 8/22* (2009.01)
*H04W 28/02* (2009.01)
*H04W 28/10* (2009.01)
*H04W 76/10* (2018.01)
*H04W 76/12* (2018.01)
*H04W 76/14* (2018.01)

(56) References Cited

OTHER PUBLICATIONS

3GPP TS 29.244 V16.1.0, "3rd Generation Partnership Project; Technical Specification Group Core Network and Terminals; Interface between the Control Plane and the User Plane Nodes; Stage 3 (Release 16)," Sep. 2019, 243 pages.

* cited by examiner

IMPROVING CLASSIFICATION ACCURACY IN USER PLANE FUNCTION RE-SELECTION SCENARIOS

CROSS REFERENCE TO RELATED APPLICATIONS

This application is a 35 U.S.C. § 371 national stage application of PCT International Application No. PCT/EP2020/073890 filed on Aug. 26, 2020, which claims the benefit of European Patent Application No. 20382421.4, filed on May 19, 2020, the disclosures and content of which are incorporated by reference herein in their entireties.

TECHNICAL FIELD

The present disclosure relates generally to communications, and more particularly to communication methods and related devices and nodes supporting wireless communications.

BACKGROUND

The 5G reference architecture as defined by 3GPP is illustrated in FIG. 1. The Network Slice Selection Function (NSSF) 100 enables selecting of the network slice instances to serve the user equipment (UE) 124, determining an allowed network slice selection assistance information (NS-SAI), and determining the Access and Mobility Management Function (AMF) set to be used to serve the UE. The network exposure function (NEF) 102 is used to provide exposure of capabilities and events, secure provision of information from external application to 3GPP network, translation of internal/external information. The New Function (NF) Repository Function (NRF) 104 provides service discovery functions, maintains NF profile and available NF instances. The policy control function (PCF) 106 supports unified policy framework to govern network behavior, providing policy rules to CP functions, and access subscription information for policy decisions in the unified data repository (UDR). The unified data management (UDM) 108 supports generation of Authentication and Key Agreement (AKA) credentials, user identification handling, access authorization, subscription management, etc. The application function (AF) 110 supports: application influence on traffic routing, accessing NEF, interaction with policy framework for policy control, etc. The authentication server function (AUSF) 112 provides the functions of an authentication server. The AMF 114 supports termination of (non-access stratum (NAS) signalling, NAS ciphering & integrity protection, registration management, connection management, mobility management, access authentication and authorization, security context management, etc. The session management function (SMF) 116 supports session management (session establishment, modification, and release), UE Internet Protocol (IP) address allocation & management, dynamic host control protocol (DHCP) functions, termination of NAS signalling related to session management, downlink (DL) data notification, traffic steering configuration for user plane function (UPF) for proper traffic routing, etc. The data network (DN) 118 identifies Service Provider services, Internet access or 3rd party services. The UPF 120 supports packet routing & forwarding, packet inspection, Quality of Service (QOS) handling, acts as external protocol data unit (PDU) session point of interconnect to the DN, and is an anchor point for intra- & inter-RAT mobility.

FIG. 2 illustrates the 3GPP 5GC architecture for policy, charging, and analytics. The 5G System architecture allows the UDM 108, the PCF 106, and the NEF 102 to store data in the UDR 200, including subscription data and policy data by UDM 108 and PCF 106, structured data for exposure and application data (including Packet Flow Descriptions (PFDs) for application detection, AF request information for multiple UEs) by the NEF 102.

In addition to supporting unified policy framework to govern network behavior, the PCF 106 provides Policy and Charging Control (PCC) rules to the SMF 116. The network data analytics function (NWDAF) 202 provides load level information at a network slice level and provides slice specific network data analytics to the PCF 106, as well as the NSSF 100 over their specified interfaces (i.e., Nnwdaf, Nnssf and Npcf). The charging function (CHF) 204 supports offline and online charging functionality and exposes the Nchf interface towards the consumers (e.g. SMF) of CHF 204.

The Session Management function (SMF) 116 supports different functionality, e.g. Session Establishment, modify and release, and policy related functionalities such as termination of interfaces towards Policy control functions, charging data collection, support of charging interfaces and control and coordination of charging data collection at UPF 120. The SMF 116 receives PCC rules from PCF 106 and configures UPF 120 accordingly through N4 reference point using the packet forwarding control protocol (PFCP protocol) used on the N4 reference point as follows:

SMF 116 controls the packet processing in the UPF 120 by establishing, modifying or deleting PFCP Sessions and by provisioning (i.e. adding, modifying or deleting) packet detection rules (PDRs), forwarding action rules (FARs), QoS enforcement rules (QERs) and/or usage reporting rules (URRs) per PFCP session, whereby a PFCP session may correspond to an individual PDU session or a standalone PFCP session not tied to any PDU session.

Each PDR contains a packet detection information (PDI) specifying the traffic filters or signatures against which incoming packets are matched. Each PDR is associated to the following rules providing the set of instructions to apply to packets matching the PDI:

one FAR, which contains instructions related to the processing of the packets, specifically forward, duplicate, drop or buffer the packet with or without notifying the control plane (CP) function about the arrival of a downlink (DL) packet.

zero, one or more QERs, which contains instructions related to the QoS enforcement of the traffic;

zero, one or more URRs, which contains instructions related to traffic measurement and reporting.

The User Plane function (UPF) 120 supports handling of user plane traffic based on the rules received from SMF 116, such as packet inspection (through PDRs) and different enforcement actions, e.g. traffic steering, QoS, Charging/Reporting (through FARs, QERs, URRs).

DPI (Deep Packet Inspection), embedded in UPF 120, is a technology that supports packet inspection and service classification, which involves IP packets classified according to a configured tree of rules so that they are assigned to a particular service session. DPI technology, offers two types of analysis:

Shallow packet inspection: extracts basic protocol information such as IP addresses (source, destination) and other low-level connection states. This information typically resides in the packet header itself and consequently reveals the principal communication intent.

Deep Packet Inspection (DPI) provides application awareness. This is achieved by analyzing the content in both the packet header and the payload over a series of packet transactions. There are several possible methods of analysis used to identify and classify applications and protocols that are grouped into signatures. One of them is heuristic signatures which is related with the behavioral analysis of the user traffic.

SUMMARY

Operation and maintenance (OAM) activities interrupt the availability of the systems. During those activities, the user traffic is affected. UPF re-selection is a quite common scenario as it can be triggered for multiple reasons (e.g. mobility, software upgrade, load (re) balancing, hardware or software failure, etc.). Traffic analysis and classification is stateful, so if UPF re-selection is triggered while the user is running application traffic, and specifically a flow (or a set of flows) is ongoing, the new UPF would not be able to classify this traffic properly (as it does not have any state information), resulting in incorrect charging. In an overloaded system, user traffic is discarded. Under situations of low traffic, energy consumption is higher. Systems are statically configured and they cannot be adapted according to traffic. Thus, during these changes in the system or network issues in the system, there are users that are not being analyzed or classified because the system has been restarted or is not able to process the traffic.

In some embodiments of inventive concepts, a method to classify traffic of a user equipment (UE) by a user plane function (UPF) in a network node is provided. The method includes receiving a packet flow control protocol (PFCP) session establishment request comprising a session identifier (ID) and a flow information profile. The method includes responsive to the flow information profile indicating that flow information is to be stored for sessions by the UE, determining whether or not there is stored flow information for a session associated with the session ID. The method further includes receiving UE application traffic from a UE, the UE application traffic including the session ID. The method includes responsive to there being stored flow information for the session, classifying the UE application traffic based on the stored flow information. The method includes responsive to there not being stored flow information for the session: classifying the UE application traffic for a corresponding packet detection rule, PDR, of the session, and storing flow information for the session based on the classifying.

UPF function/nodes, computer program products, and computer programs are provided that, when activated, perform analogous operations to the above method.

Advantages that may be achieved using the flow information storage include improved accuracy for classification of end user traffic in UPF re-selection scenarios. This allows traffic to be charged properly to an external Online Charging System (or by CDRs). This has benefits not only for charging, but for any other enforcement action (e.g. QoS). Additional advantages include that network operators can choose which type of re-selection to apply in each moment according to user traffic load or even the inspected traffic, that network operators can migrate end user traffic to different UPFs without impacting the classification, and that network operators could keep UPFs specially dedicated for premium users where the quality of service is important without any special IP network planning. Additionally, a network operator could decide to migrate heavy users (e.g. users that are using Peer to Peer protocols) to specific UPFs.

According to other embodiments of inventive concepts, a method performed by a session management function, SMF, function/node in a communication network is provided. The method includes responsive to receiving a protocol data unit, PDU, session create message including a subscriber identifier, sending a policy control request to a policy control function, PCF, function/node. The method includes receiving a policy control response from the PCF function/node, the policy control response including subscriber policy data that comprises a flow information storage profile. The method includes transmitting a packet flow control protocol, PFCP, session establishment request message that includes the flow information storage profile and a session identifier towards a user plane function, UPF, function/node.

SMF function/nodes, computer program products, and computer programs are provided that, when activated, perform analogous operations to the above method.

According to various other embodiments of inventive concepts, a method performed by a database includes receiving a flow information storage policy from a network node. The method includes storing the flow information storage policy. The method includes receiving a policy request query from a session management function (SMF) function/node. The method includes transmitting a query response to the SMF function/node that includes a subscriber policy profile including a flow information storage profile.

Databases, computer program products, and computer programs are provided that, when activated, perform analogous operations to the above method.

According to yet other embodiments of inventive concepts, a method performed by a policy control function (PCF) function/node includes receiving a policy control request from a session management function (SMF) function/node for a policy for a specified user session, the policy control request including a subscriber identifier. The method includes transmitting a policy control response to the SMF function/node, the policy control response including a subscriber policy profile including a flow information storage profile associated with the subscriber identifier.

PCF function/nodes, computer program products, and computer programs are provided that, when activated, perform analogous operations to the above method.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
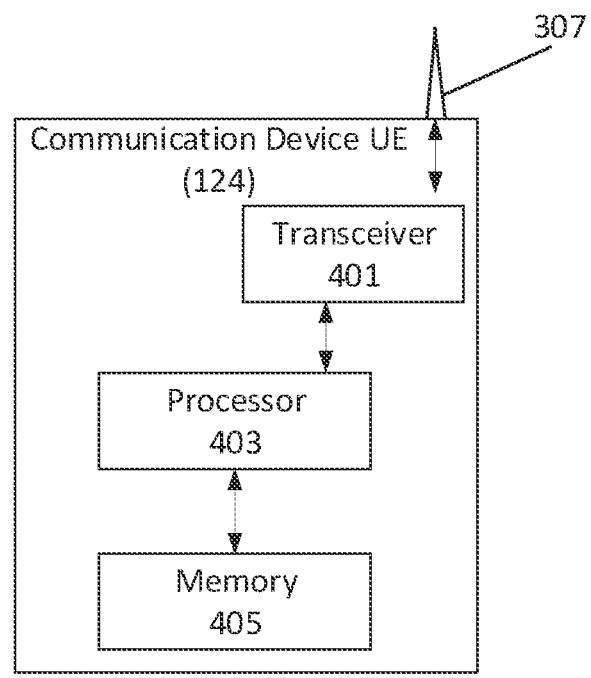
FIG. 4 is a block diagram illustrating a communication device UE according to some embodiments of inventive concepts.

FIG. 4 is a block diagram illustrating elements of a communication device UE 400 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device UE may include an antenna 407, and transceiver circuitry 301 (also referred to as a transceiver) including a transmitter and a receiver configured to provide uplink and downlink radio communications with a base station(s) (also referred to as a RAN node) of a radio access network. Communication device UE may also include processing circuitry 403 (also referred to as a processor) coupled to the transceiver circuitry, and memory circuitry 405 (also referred to as memory, e.g., a device readable medium) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required. Communication device UE may also include an interface (such as a user interface) coupled with processing circuitry 403, and/or communication device UE may be incorporated in a vehicle.

As discussed herein, operations of communication device UE 400 may be performed by processing circuitry 403 and/or transceiver circuitry 401. For example, processing circuitry 403 may control transceiver circuitry 401 to transmit communications through transceiver circuitry 401 over a radio interface to a radio access network node (also referred to as a base station) and/or to receive communications through transceiver circuitry 401 from a RAN node over a radio interface. Moreover, modules may be stored in memory circuitry 405, and these modules may provide instructions so that when instructions of a module are executed by processing circuitry 403, processing circuitry 403 performs respective operations (e.g., operations discussed below with respect to Example Embodiments relating to wireless communication devices).

Figure 5:
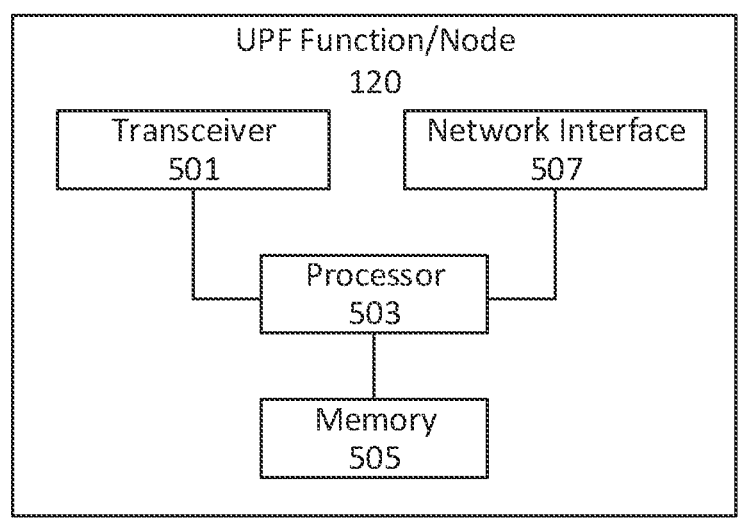
FIG. 5 is a block diagram illustrating a user plane function (UPF) function/node according to some embodiments of inventive concepts.

FIG. 5 is a block diagram illustrating elements of a user plane function (UPF) node 500 (also referred to as a UPF function/node) communication network configured to provide communication according to embodiments of inventive concepts. As shown, the UPF function/node 500 may include transceiver circuitry 501 (also referred to as a transceiver) including a transmitter and a receiver configured to provide communications with mobile terminals and network functions/nodes. The UPF function/node 500 may include network interface circuitry 507 (also referred to as a network interface) configured to provide communications with other nodes of a communication network and/or a core network. The UPF function/node 500 may also include processing circuitry 503 (also referred to as a processor) coupled to the transceiver circuitry, and memory circuitry 505 (also referred to as memory, e.g., corresponding to a device readable medium) coupled to the processing circuitry 503. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the UPF function/node 500 may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to UPF function/nodes).

Figure 6:
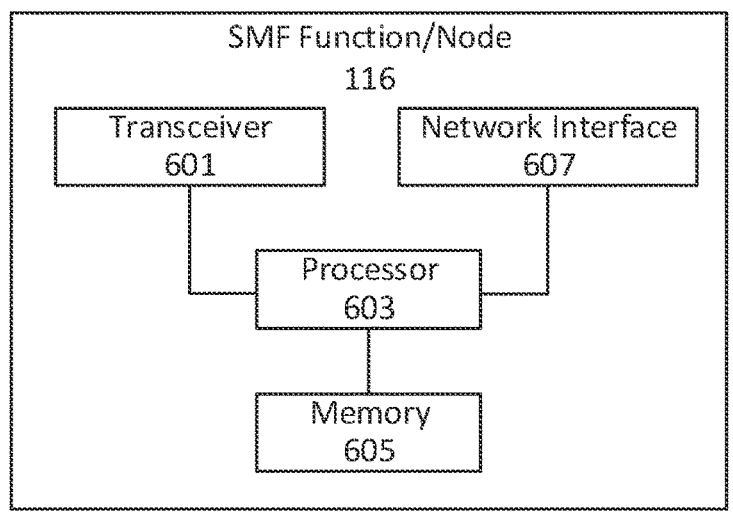
FIG. 6 is a block diagram illustrating an SMF function/node according to some embodiments of inventive concepts.

FIG. 6 is a block diagram illustrating elements of a session management function, SMF, function/node 600 (e.g., an SMF function/node) of a communication network configured to provide cellular communication according to embodiments of inventive concepts. As shown, the SMF function/node may include network interface circuitry 607

(also referred to as a network interface) configured to provide communications with other nodes of the core network and/or other nodes. The SMF function/node may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the SMF function/node 600 may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to SMF function/nodes).

Figure 7:
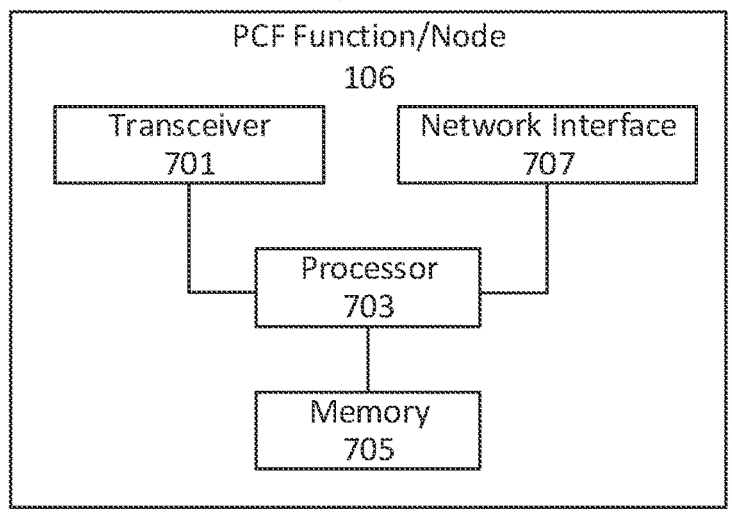
FIG. 7 is a block diagram illustrating a PCF function/node according to some embodiments of inventive concepts.

FIG. 7 is a block diagram illustrating elements of a policy control function, PCF, function/node 700 (e.g., a PCF function/node) of a communication network configured to provide cellular communication according to embodiments of inventive concepts. As shown, the PCF function/node may include network interface circuitry 707 (also referred to as a network interface) configured to provide communications with other nodes of the core network and/or other nodes. The PCF function/node may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the PCF function/node 700 may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to SMF function/nodes).

Figure 8:
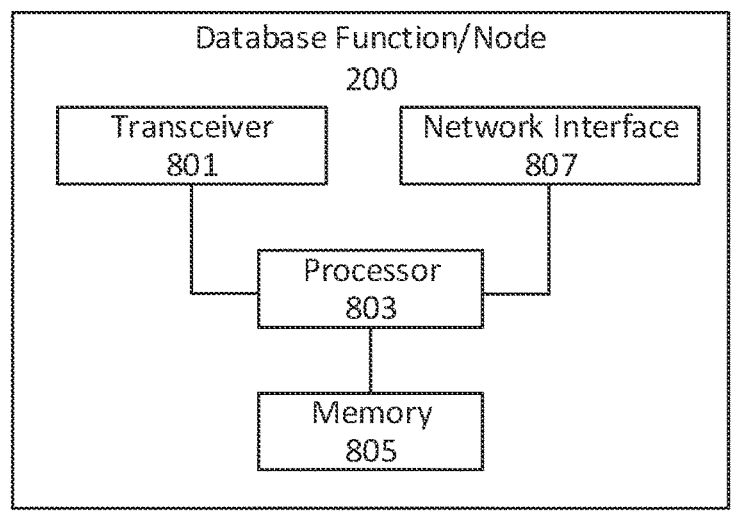
FIG. 8 is a block diagram illustrating a database function/node according to some embodiments of inventive concepts.

FIG. 8 is a block diagram illustrating elements of a database function/node 800 of a communication network configured to provide cellular communication according to embodiments of inventive concepts. As shown, the database function/node 800 may include network interface circuitry 807 (also referred to as a network interface) configured to provide communications with other nodes of the core network and/or other nodes. The SMF function/node may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the database function/node 800 may be performed by processing circuitry 803 and/or network interface circuitry 807. For example, processing circuitry 803 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations (e.g., operations discussed below with respect to Example Embodiments relating to database function/nodes).

As previously indicated, operation and maintenance (OAM) activities interrupt the availability of the systems. During those activities, the user traffic is affected.

Additionally, smartphones run applications that are constantly connected to the mobile network. The number of new applications and new versions of applications increases every year, consequently the current detection protocol mechanisms should change according to the state of the art of the internet protocols in a dynamic way. The probability of incorrect protocol detection increases as a consequence of the new protocols and applications increment every year. UPF 120 which is responsible of observing those applications may periodically update its detection engine in order to be able of classifying them. UPF 120 should be able to perform this updating activity while system is running and without service disruption to end users and maintaining a continuous charging of services.

UPF re-selection can be a common scenario as it can be triggered for multiple reasons (e.g. mobility, software upgrade, load (re) balancing, hardware or software failure, etc).

Traffic analysis and classification is stateful, so if UPF re-selection is triggered while the user is running application traffic, and a flow (or a set of flows) is ongoing, the new UPF would not be able to classify this traffic properly (as it does not have any state information), resulting in incorrect charging. Therefore, it is critical to ensure that PCC and PDR rules already matched the traffic and the crucial machine state information are never lost.

In current standards, there is no procedure for implementing a re-selection between UPFs ensuring that there is no traffic mis-classification or at least that is minimal traffic mis-classification. For example, high availability solutions need more than one UPF that can handle user traffic. There is no re-selection procedure between UPFs where SMF 116 could interact as intermediary and therefore ensure that the classification loss is minimal.

Currently, in many UPFs 120, there is not any re-selection procedure that keeps the detection/classification results for the affected users during the handover. The new UPF 120 which handles the user traffic for a handover session has to start again the process of analysis classification with no previous reference. Therefore, the new UPF will not be able to classify the user traffic correctly for the traffic detection algorithms that require keeping a detection result historic (state machine memory or based on heuristic algorithms). User traffic is misclassified and probably is charged incorrectly if this traffic is being reported to an Online Charging Server. Heuristic analysis has been developed with the intention to uniquely and completely identify its related application or protocol, but there are cases in which the signature is not robust (weak signature) and needs to have user traffic metrics or previous traffic patterns (signatures) that are critical to get a proper detection and classification.

There is also another type of problem regarding the consumption of energy in the system and how the system reacts when it is overloaded. In overloaded system, user traffic is discarded. Under situations of low traffic, energy consumption is higher. Systems are statically configured and they cannot be adapted according to traffic.

Operator improves their availability by having standby nodes ready for operation in case of a failure impacting the active nodes, such as a link failure.

In summary, during those changes in the system or network issues in the system, there are users that are not being analyzed or classified because system has been restarted or not able to process the traffic.

Various embodiments of inventive concepts described herein address the problems described above. In some embodiments, the PFPC protocol is extended to improve traffic classification accuracy in UPF re-selection scenarios.

At an operator's network, a feature designated as "Flow information storage" can be enabled/disabled on a per application, on a per subscriber, on a per group of subscribers, on a per slice basis and/or on a per global basis.

In the PFCP Association procedure, UPF 120 reports to SMF 116 a capability (Flow information storage). This allows the SMF 116 to select a UPF 120 supporting this capability on a per PFCP session basis.

For each PFCP session, the SMF 116 activates "Flow information storage" in the UPF 120 by extending the PFCP protocol with an indication of the flow information to be stored (as an example, see below three different profiles):

Profile 1: 5-tuple information, last Heuristic matched, etc
Profile 2: Just the 5-tuple information
Profile 3: No flow information to be stored
Fewer or more profiles may be used.

The UPF 120 analyzes traffic for the PFCP session (which matches the corresponding PDRs). For the traffic matching a PDR with this feature ("Flow information storage") enabled, based on the above profiles, the UPF 120 stores in UDR 200 the relevant flow information. The may be achieved by providing the UDR 200 with a "Flow Information" data structure and also allowing the UPF 116 to write directly in UDR 200. Other alternatives are possible on where to store the flow information.

For each PFCP session, whenever there is a change of UPF 120 (UPF re-selection), the new UPF retrieves the flow information from the UDR 200 and uses the flow information to classify traffic (resulting in better classification accuracy).

Advantages that may be achieved using the flow information storage include improved accuracy for classification of end user traffic in UPF re-selection scenarios. This allows traffic to be charged properly to an external Online Charging System (or by CDRs). This has benefits not only for charging, but for any other enforcement action (e.g. QoS). Additional advantages include that network operators can choose which type of re-selection to apply in each moment according to user traffic load or even the inspected traffic, that network operators can migrate end user traffic to different UPFs without impacting the classification, and that network operators could keep UPFs specially dedicated for premium users where the quality of service is important without any special IP network planning. Additionally, a network operator could decide to migrate heavy users (e.g. users that are using Peer to Peer protocols) to specific UPFs.

The inventive concepts may be based on extending the PFCP protocol to improve traffic classification accuracy in UPF re-selection scenarios. The extension shall be described under a UPF re-selection scenario that is illustrated in FIGS. 3A-3C.

Figure 1:
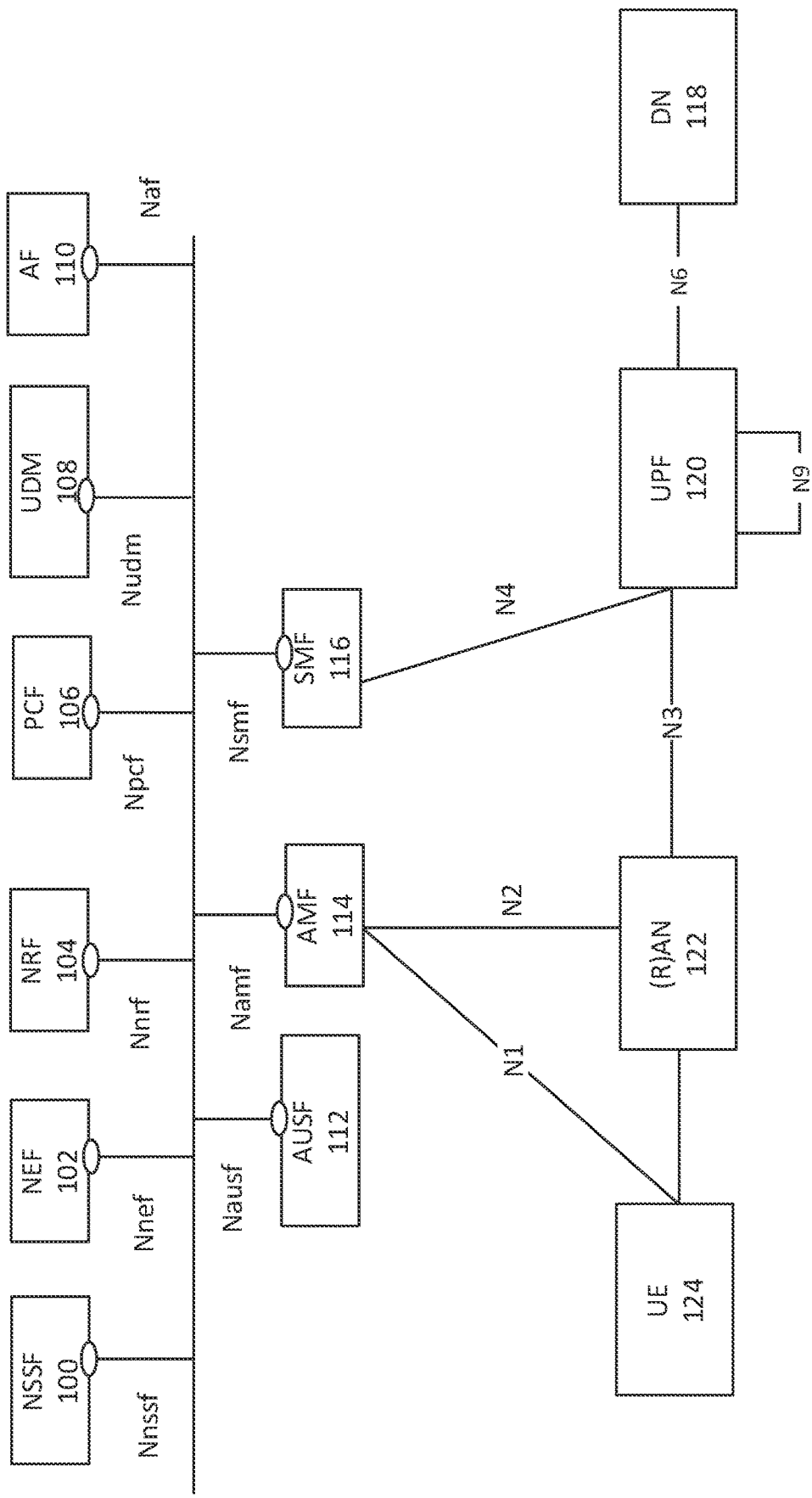
FIG. 1 is a block diagram illustrating a 5G network architecture.
Figure 2:
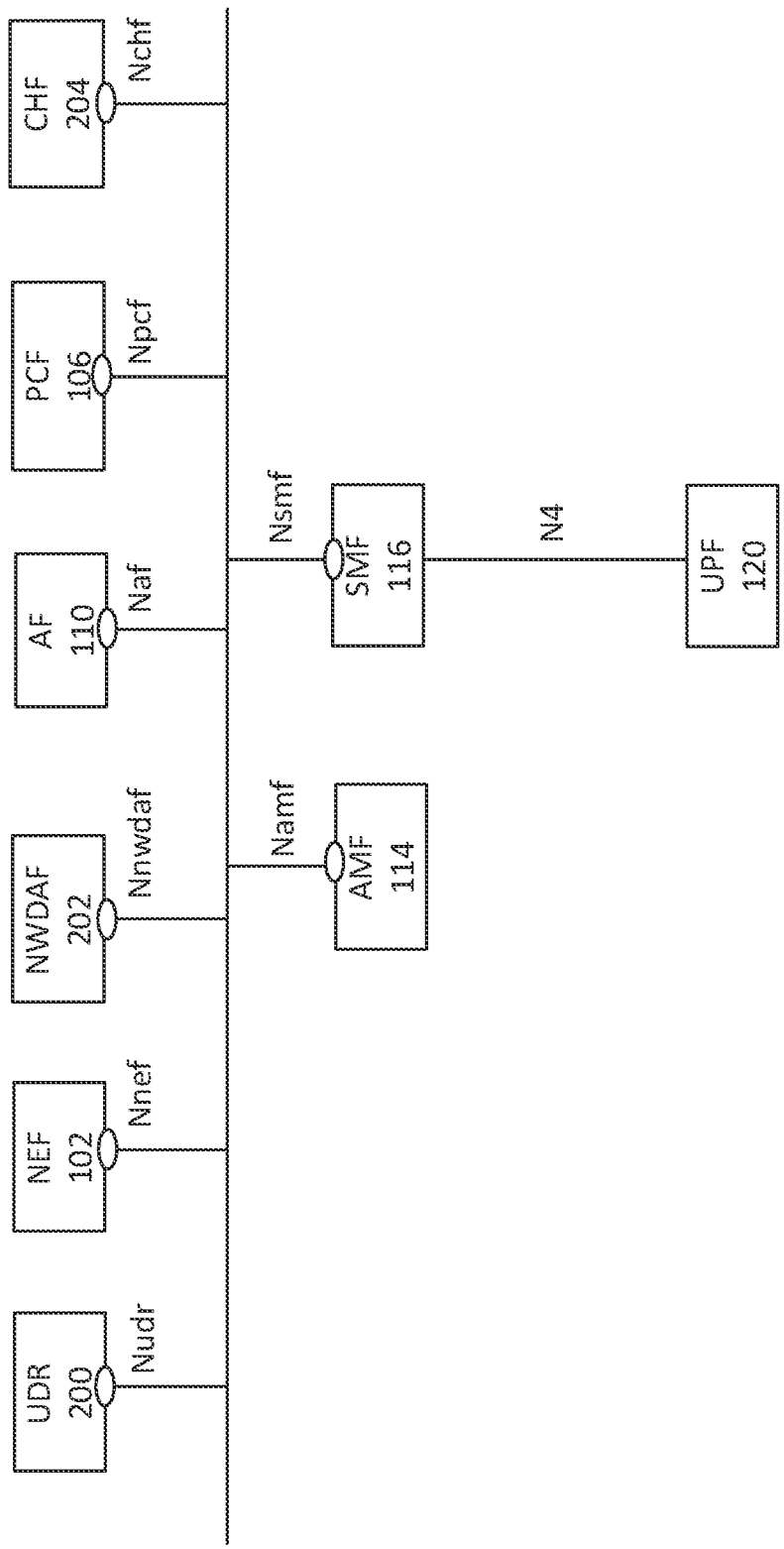
FIG. 2 is a block diagram illustrating a 5GC architecture for policy, charging, and analytics.
Figure 3A:
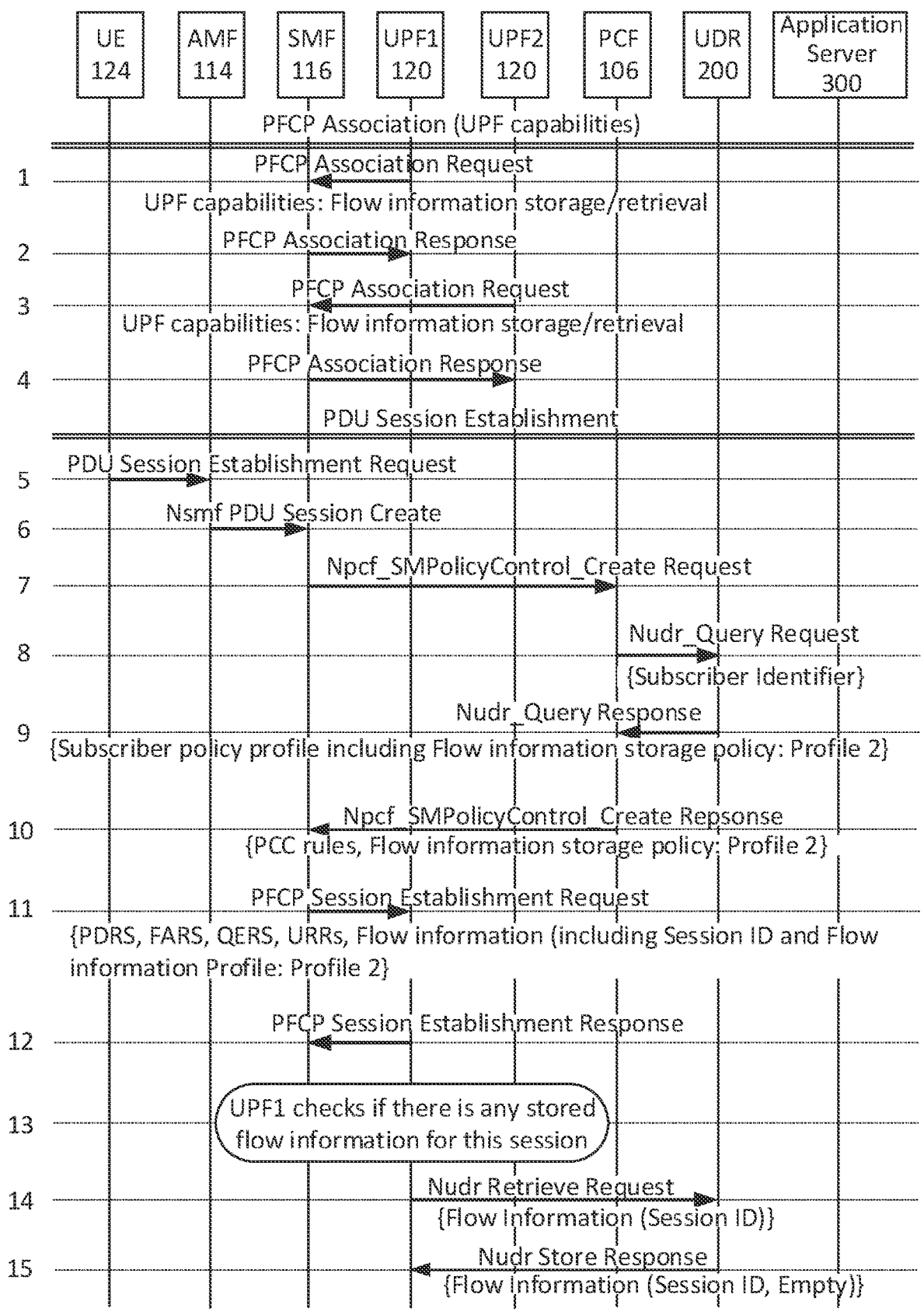
FIGS. 3A-3C is a signaling diagram illustrating a procedure to improve classification accuracy at UPF re-selection according to some embodiments of inventive concepts.
Figure 3B:
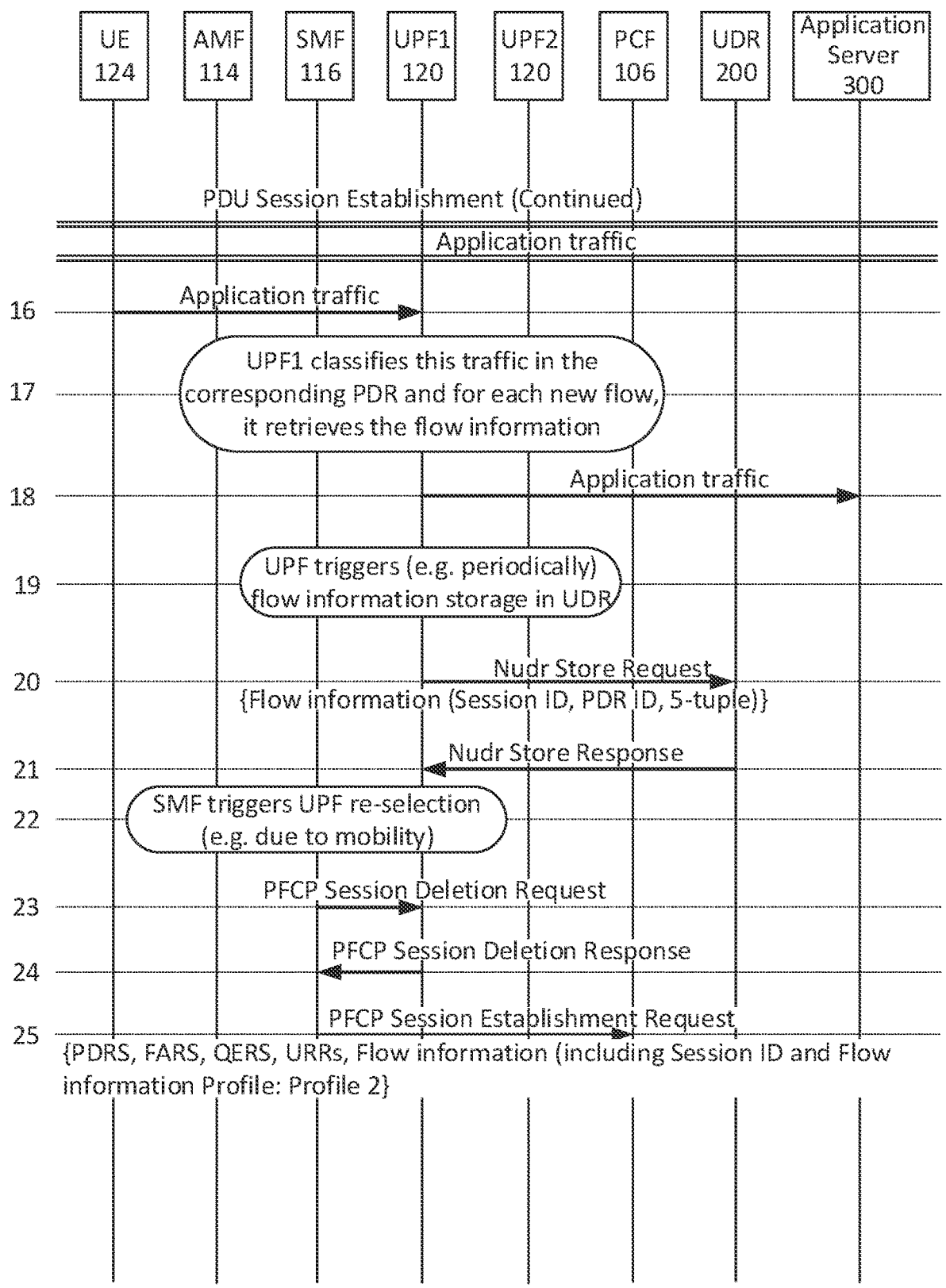
Figure 3C:
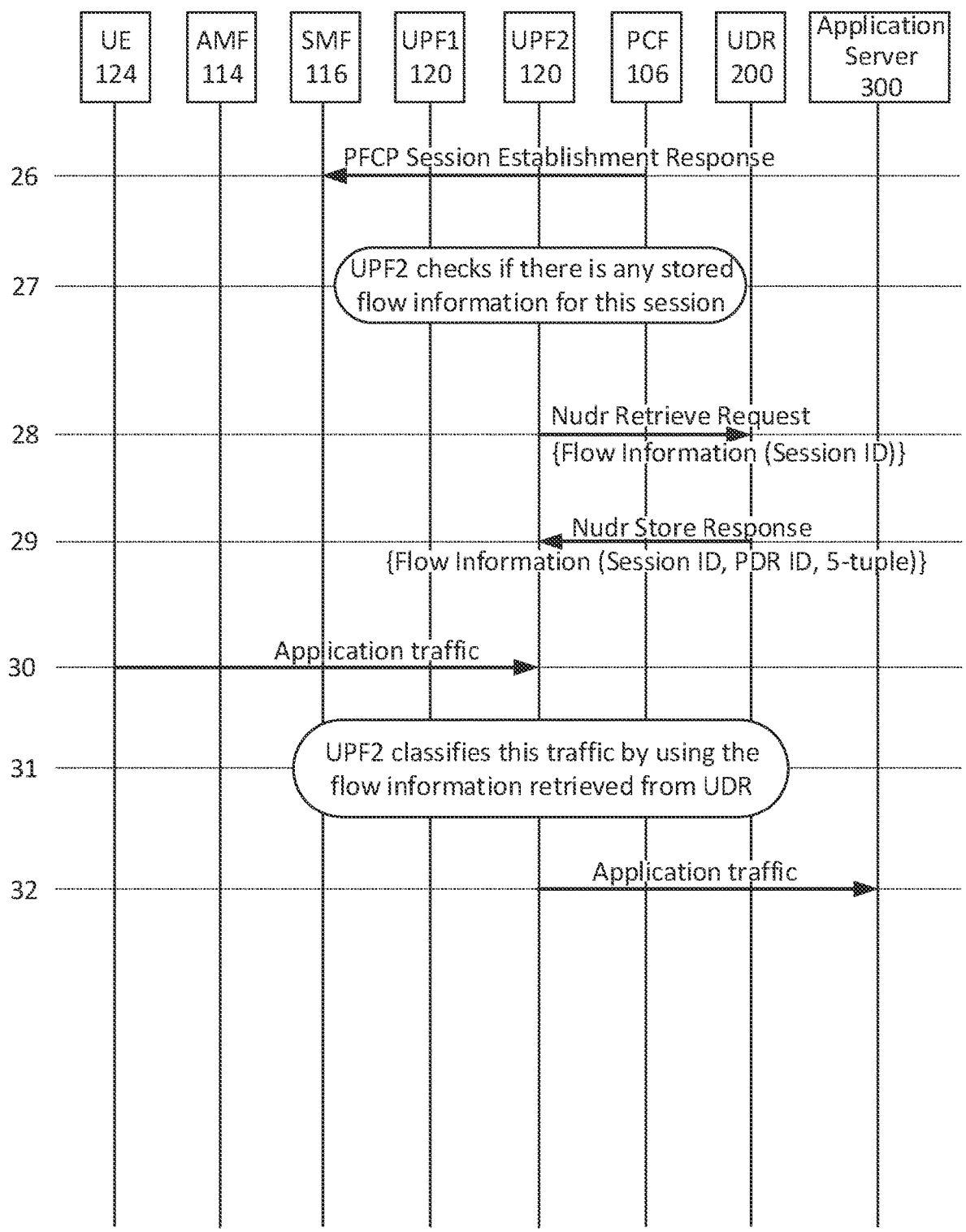

A precondition to the signaling diagram in FIGS. 3A-3C is that a flow information storage/retrieval policy is pre-configured in UDR 200 as subscriber policy data. This example shows per subscriber policies, but this flow information storage policy in other embodiments of inventive concepts can be applied to a certain application, to a group of subscribers, to a certain slice or globally (e.g. on a per node or network basis), etc.

Turning now to FIG. 3A, in steps 1-4, in a PFCP Association procedure between UPF 120 and SMF 116 entities, the existing procedure is extended to report UPF capabilities with a new capability (Flow information storage and retrieval: FISU, see table 1 below in bold and underlined). The FISU capability allows the SMF 116 to know which UPFs 120 support this capability and thus can influence on UPF (re)-selection. In the example illustrated in FIGS. 3A-3C, both UPF1 and UPF2 report the FISU capability.

TABLE 1

UP Function Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |

TABLE 1-continued

UP Function Features

| Feature Octet/Bit | Feature | Interface | Description |
|---|---|---|---|
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | FISU | Sxb, Sxc, N4 | Flow information storage and retrieval is supported by the UP function. |

In steps 5 and 6, UE 124 triggers PDU session establishment, by means of sending a PDU Session Establishment Request to AMF 114. AMF 114 selects an SMF 116 to manage the PDU session (the SMF selection function in the AMF selects an SMF instance based on the available SMF instances obtained from NRF or on the configured SMF information in the AMF) and triggers Nsmf PDU Session Create. Note the sequence diagram in FIG. 3 does not include all the signaling messages involved in the PDU Session Establishment procedure. The relevant signaling messages for describing inventive concepts are described in subsequent steps.

In step 7, SMF 116 triggers Npcf_SMPolicyControl_Create Request message to retrieve SM policies for the user PDU session.

In step 8, PCF 106 triggers Nudr_Query Request message including the subscriber identifier to retrieve the policy data for this subscriber's PDU session.

In step 9, UDR 200 answers with Nudr_Query Response message including the Subscriber Policy Data, which includes a Flow information storage policy. As an example, three possible profiles as Flow information storage policies are used:

Profile 1: 5-tuple information, last Heuristic matched, etc.
Profile 2: Just the 5-tuple information
Profile 3: Nothing to be stored
A different number of profiles may be used.

In the example of the sequence diagram of FIGS. 3A-3C, Profile 2 shall be used, which means that only the 5-tuple information needs to be stored. This example also assumes the Flow information storage policy applies on a per subscriber's PDU session basis. It is also possible to configure different Flow information storage policies for each application (e.g. Profile 1 for appId=Netflix and Profile 2 for the rest of applications, in case Netflix traffic is charged and the rest of applications are not charged, but just some QoS enforcement applies).

In step 10, PCF 106 generates the corresponding PCC rule/s based on Subscriber Policy Data, and also includes the Flow information storage policy (Profile2), which in this example applies on a per PDU session basis.

In steps 11 and 12, SMF 116 selects UPF1 and triggers PFCP Session Establishment procedure towards UPF1 to provision the PDRs (and the corresponding enforcement actions: FARs, URRs, etc) for the PDU session. SMF 116 will provision the Flow information storage policy (Profile2) together with an identifier (Session ID), that UPF1 will use when storing (in UDR 200) the flow information for this session. This identifier will also be sent by SMF 116 to UPF2 (at UPF re-selection), so UPF2 can later retrieve the flow information for this particular session. In order to do this, the PFCP protocol can be extended by adding a new "Flow Information" IE at "PFCP Session Establishment/Modification Request", as shown in Tables 2 and 3 below in bold and underlined:

TABLE 2

Information Elements in an PFCP Session Establishment Request

| Information elements | P | Condition/Comment | Appl. Sxa | Sxb | Sxc | N4 | IE Type |
|---|---|---|---|---|---|---|---|
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Create PDR | M | This IE shall be present for at least one PDR to be associated to the PFCP session. Several IEs with the same IE type may be present to represent multiple PDRs. See Table 7.5.2.2-1. | X | X | X | X | Create PDR |
| Create FAR | M | This IE shall be present for at least one FAR to be associated to the PFCP session. Several IEs with the same IE type may be present to represent multiple FARs. See Table 7.5.2.3-1. | X | X | X | X | Create FAR |
| Create URR | C | This IE shall be present if a measurement action shall be applied to packets matching one or more PDR(s) of this PFCP session. Several IEs within the same IE type may be present to represent multiple URRs. See Table 7.5.2.4-1. | X | X | X | X | Create URR |
| Create QER | C | This IE shall be present if a QoS enforcement or QoS marking action shall be applied to packets matching one or more PDR(s) of this PFCP session. Several IEs within the same IE type may be present to represent multiple QERs. See Table 7.5.2.5-1. | — | X | X | X | Create QER |
| Create BAR | O | When present, this IE shall contain the buffering instructions to be applied by the UP function to any FAR of this PFCP session set with the Apply Action requesting the packets to be buffered and with a BAR ID IE referring to this BAR. See table 7.5.2.6-1. | X | — | — | X | Create BAR |
| Create Traffic Endpoint | C | This IE may be present if the UP function has indicated support of PDI optimization. Several IEs within the same IE type may be present to represent multiple Traffic Endpoints. See Table 7.5.2.7-1. | X | X | X | X | Create Traffic Endpoint |
| PDN Type | C | This IE shall be present if the PFCP session is setup for an individual PDN connection or PDU session (see clause 5.2.1). When present, this IE shall indicate whether this is an IP or non-IP PDN connection/PDU session or, for 5GC, an Ethernet PDU session. See NOTE 3. | X | X | — | X | PDN Type |
| SGW-C FQ-CSID | C | This IE shall be included according to the requirements in clause 23 of 3GPP TS 23.007 [24]. | X | X | — | — | FQ-CSID |
| MME FQ-CSID | C | This IE shall be included when received on the S11 interface or on S5/S8 interface according to the requirements in clause 23 of 3GPP TS 23.007 [24]. | X | X | — | — | FQ-CSID |
| PGW-C FQ-CSID | C | This IE shall be included according to the requirements in clause 23 of 3GPP TS 23.007 [24]. | X | X | — | — | FQ-CSID |
| ePDG FQ-CSID | C | This IE shall be included according to the requirements in clause 23 of 3GPP TS 23.007 [24]. | — | X | — | — | FQ-CSID |
| TWAN FQ-CSID | C | This IE shall be included according to the requirements in clause 23 of 3GPP TS 23.007 [24]. | — | X | — | — | FQ-CSID |
| User Plane Inactivity Timer | O | This IE may be present to request the UP function to send a User Plane Inactivity Report when no user plane packets are received for this PFCP session for a duration exceeding the User Plane Inactivity Timer. When present, it shall contain the duration of the inactivity period after which a User Plane Inactivity Report shall be generated. | — | X | X | X | User Plane Inactivity Timer |
| User ID | O | This IE may be present, based on operator policy. It shall only be sent if the UP function is in a trusted environment. See NOTE. | X | X | X | X | User ID |

TABLE 2-continued

Information Elements in an PFCP Session Establishment Request

| Information elements | P | Condition/Comment | Appl. Sxa | Sxb | Sxc | N4 | IE Type |
|---|---|---|---|---|---|---|---|
| Trace Information | O | When present, this IE shall contain the trace instructions to be applied by the UP function for this PFCP session. | X | X | X | X | Trace Information |
| APN/DNN | O | This IE may be present, if related functionalities in the UP function require the APN/DNN information. See NOTE 2. | X | X | — | X | APN/DNN |
| Create MAR | C | This IE shall be present for a N4 session established for a MA PDU session. Several IEs with the same IE type may be present to represent multiple MARs. See Table 7.5.2.8-1. | — | — | — | X | Create MAR |
| Flow Information | C | This IE shall be present if UPF requires to store/retrieve the Flow Information for this session. | — | X | X | X | Flow Information |

NOTE 1:
This can be used for troubleshooting problems in the UP function affecting a subscriber.
NOTE 2:
The CP function may provide additional information (e.g. APN/DNN) to the UP function, e.g. used by the forwarding rules pre-defined in UP function (some forwarding rules are APN specific), used by the UP function for performance measurement, etc.
NOTE 3:
The SGW-C may set PDN type as Non-IP for an Ethernet PDN to allow interworking with a legacy SGW-U.

TABLE 3

Flow Information IE

Octet 1 and 2
Usage Report IE Type = 80 (decimal)
Octets 3 and 4
Length = n

| Information elements | P | Condition/Comment | IE Type |
|---|---|---|---|
| Session ID | M | This IE shall identify the Session ID used to store/retrieve Flow information data in UDR. | Session ID |
| Flow Information Profile | C | The name of the Flow Information profile. | Flow Information Profile |

In this example:
Session ID=X (a value generated by SMF)
Flow Information Profile=Profile2

In step 10, PCF 106 generates the corresponding PCC rule/s based on Subscriber Policy Data, and also includes the Flow information storage policy (Profile2), which in this example applies on a per PDU session basis.

In steps 11 and 12, SMF 116 selects UPF1 120 and triggers PFCP Session Establishment procedure towards UPF1 120 to provision the PDRs (and the corresponding enforcement actions: FARs, URRs, etc) for the PDU session. Specifically, SMF 116 will provision the Flow information storage policy (Profile2) together with an identifier (Session ID), that UPF1 120 will use when storing (e.g., in UDR 200) the flow information for this session. This identifier will also be sent by SMF 116 to UPF2 120 (at UPF re-selection), so UPF2 120 can later retrieve the flow information for this particular session. In order to do this, in one embodiment, the PFCP protocol is extended by adding a new "Flow Information" IE at "PFCP Session Establishment/Modification Request", as shown in Table 4 below in bold and underline.

TABLE 4

Information Elements in an PFCP Session Establishment Request

| Information elements | P | Condition/Comment | Appl. Sxa | Sxb | Sxc | N4 | IE Type |
|---|---|---|---|---|---|---|---|
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Create PDR | M | This IE shall be present for at least one PDR to be associated to the PFCP session. Several IEs with the same IE type may be present to represent multiple PDRs. See Table 7.5.2.2-1. | X | X | X | X | Create PDR |
| Create FAR | M | This IE shall be present for at least one FAR to be associated to the PFCP session. Several IEs with the same IE type may be present to represent multiple FARs. See Table 7.5.2.3-1. | X | X | X | X | Create FAR |

TABLE 4-continued

Information Elements in an PFCP Session Establishment Request

| Information elements | P | Condition/Comment | Appl. Sxa | Sxb | Sxc | N4 | IE Type |
|---|---|---|---|---|---|---|---|
| Create URR | C | This IE shall be present if a measurement action shall be applied to packets matching one or more PDR(s) of this PFCP session. Several IEs within the same IE type may be present to represent multiple URRs. See Table 7.5.2.4-1. | X | X | X | X | Create URR |
| Create QER | C | This IE shall be present if a QoS enforcement or QoS marking action shall be applied to packets matching one or more PDR(s) of this PFCP session. Several IEs within the same IE type may be present to represent multiple QERs. See Table 7.5.2.5-1. | — | X | X | X | Create QER |
| Create BAR | O | When present, this IE shall contain the buffering instructions to be applied by the UP function to any FAR of this PFCP session set with the Apply Action requesting the packets to be buffered and with a BAR ID IE referring to this BAR. See table 7.5.2.6-1. | X | — | — | X | Create BAR |
| Create Traffic Endpoint | C | This IE may be present if the UP function has indicated support of PDI optimization. Several IEs within the same IE type may be present to represent multiple Traffic Endpoints. See Table 7.5.2.7-1. | X | X | X | X | Create Traffic Endpoint |
| PDN Type | C | This IE shall be present if the PFCP session is setup for an individual PDN connection or PDU session (see clause 5.2.1). When present, this IE shall indicate whether this is an IP or non-IP PDN connection/PDU session or, for 5GC, an Ethernet PDU session. See NOTE 3. | X | X | — | X | PDN Type |
| SGW-C FQ-CSID | C | This IE shall be included according to the requirements in clause 23 of 3GPP TS 23.007 [24]. | X | X | — | — | FQ-CSID |
| MME FQ-CSID | C | This IE shall be included when received on the S11 interface or on S5/S8 interface according to the requirements in clause 23 of 3GPP TS 23.007 [24]. | X | X | — | — | FQ-CSID |
| PGW-C FQ-CSID | C | This IE shall be included according to the requirements in clause 23 of 3GPP TS 23.007 [24]. | X | X | — | — | FQ-CSID |
| ePDG FQ-CSID | C | This IE shall be included according to the requirements in clause 23 of GPP TS 23.007 [24]. | — | X | — | — | FQ-CSID |
| TWAN FQ-CSID | C | This IE shall be included according to the requirements in clause 23 of 3GPP TS 23.007 [24]. | — | X | — | — | FQ-CSID |
| User Plane Inactivity Timer | O | This IE may be present to request the UP function to send a User Plane Inactivity Report when no user plane packets are received for this PFCP session for a duration exceeding the User Plane Inactivity Timer. When present, it shall contain the duration of the inactivity period after which a User Plane Inactivity Report shall be generated. | — | X | X | X | User Plane Inactivity Timer |
| User ID | O | This IE may be present, based on operator policy. It shall only be sent if the UP function is in a trusted environment. See NOTE. | X | X | X | X | User ID |
| Trace Information | O | When present, this IE shall contain the trace instructions to be applied by the UP function for this PFCP session. | X | X | X | X | Trace Information |
| APN/DNN | O | This IE may be present, if related functionalities in the UP function require the APN/DNN information. See NOTE 2. | X | X | — | X | APN/DNN |

TABLE 4-continued

Information Elements in an PFCP Session Establishment Request

| Information elements | P | Condition/Comment | Sxa | Sxb | Sxc | Appl. N4 | IE Type |
|---|---|---|---|---|---|---|---|
| Create MAR | C | This IE shall be present for a N4 session established for a MA PDU session. Several IEs with the same IE type may be present to represent multiple MARs. See Table 7.5.2.8-1. | — | — | — | X | Create MAR |
| Flow Information | C | This IE shall be present if UPF requires to store/retrieve the Flow Information for this session. | — | X | X | X | Flow Information |

NOTE 1:
This can be used for troubleshooting problems in the UP function affecting a subscriber.
NOTE 2:
The CP function may provide additional information (e.g. APN/DNN) to the UP function, e.g. used by the forwarding rules pre-defined in UP function (some forwarding rules are APN specific), used by the UP function for performance measurement, etc.
NOTE 3:
The SGW-C may set PDN type as Non-IP for an Ethernet PDN to allow interworking with a legacy SGW-U.

In this example:
Session ID=X (a value generated by SMF)
Flow Information Profile=Profile2

In steps 13 to 15, UPF1 checks if there is any stored flow information for this session. In order to do this, UPF1 triggers towards UDR 200 a Nudr Retrieve Request message including the Session ID. UDR answers UPF1 with a Nudr Store Response (indicating there is no flow information stored for this session).

Tuning to FIG. 3B, in steps 16 to 18, a user at UE 124 starts an application. UPF1 120 detects and classifies this traffic in the corresponding PDR. As this session has enabled the Flow Information storage functionality (see Step 11 above), and as the Flow Information profile (Profile2) indicates to store flow information (5-tuple), for each new flow detected, UPF1 120 retrieves and (locally) stores this flow information (5-tuple) together with the Session ID.

In steps 19 to 21, UPF1 120 triggers (e.g. periodically) flow information storage towards an external database (e.g. UDR 200). In order to do this, UPF1 120 triggers towards UDR 200 a Nudr Store Request message including a data structure with the Session ID, the PDR ID (i.e. the matched PDR) and the flow information (5-tuple). UDR 200 answers UPF1 120 with a Nudr Store Response (indicating successful operation).

In various embodiments, of inventive concepts, the UDR 200 uses a new "Flow Information" data structure, and also allows a UPF to write directly in UDR 200. But other alternatives are possible on where to store the flow information. In this example, the UDR 200 is used to store flow information, but any other database could be used.

In steps 22 to 25, SMF 116 triggers UPF re-selection (e.g. due to mobility). SMF 116 deletes the PFCP session with UPF1 120 and creates a new PFCP session towards UPF2 120, including (in step 22) the "Flow Information" IE at "PFCP Session Establishment Request."

Turning to FIG. 3C, in steps 26 to 29, UPF2 120 checks if there is any stored flow information for this session. In order to do this, UPF2 120 triggers towards UDR 200 a Nudr Retrieve Request message including the Session ID. UDR 200 answers UPF2 with a Nudr Store Response, indicating there is flow information for this session (Session ID), specifically the PDR ID and the 5-tuple/s.

In steps 30 to 32, UPF2 120 detects and classifies user traffic, by using the flow information retrieved from UDR 200. For example, for any incoming packet, UPF2 120 extracts the 5-tuple and checks if this 5-tuple corresponds to a 5-tuple already stored. If so, this packet is directly classified into the corresponding PDR ID. This results in improved classification accuracy.

Note that while the 5G network architecture was used to describe the embodiments of inventive concepts illustrated in FIGS. 3A-3C, the inventive concepts can be applied to 4G, just by replacing:
PCF by PCRF
SMF by PGW-C or TDF-C.
UPF by PGW-U or TDF-U Operations of the UPF function/node 120 (implemented using the structure of the block diagram of FIG. 5) will now be discussed with reference to the flow chart of FIG. 9 according to some embodiments of inventive concepts. For example, modules may be stored in memory 505 of FIG. 5, and these modules may provide instructions so that when the instructions of a module are executed by respective communication device processing circuitry 503, processing circuitry 503 performs respective operations of the flow chart.

Figure 9:
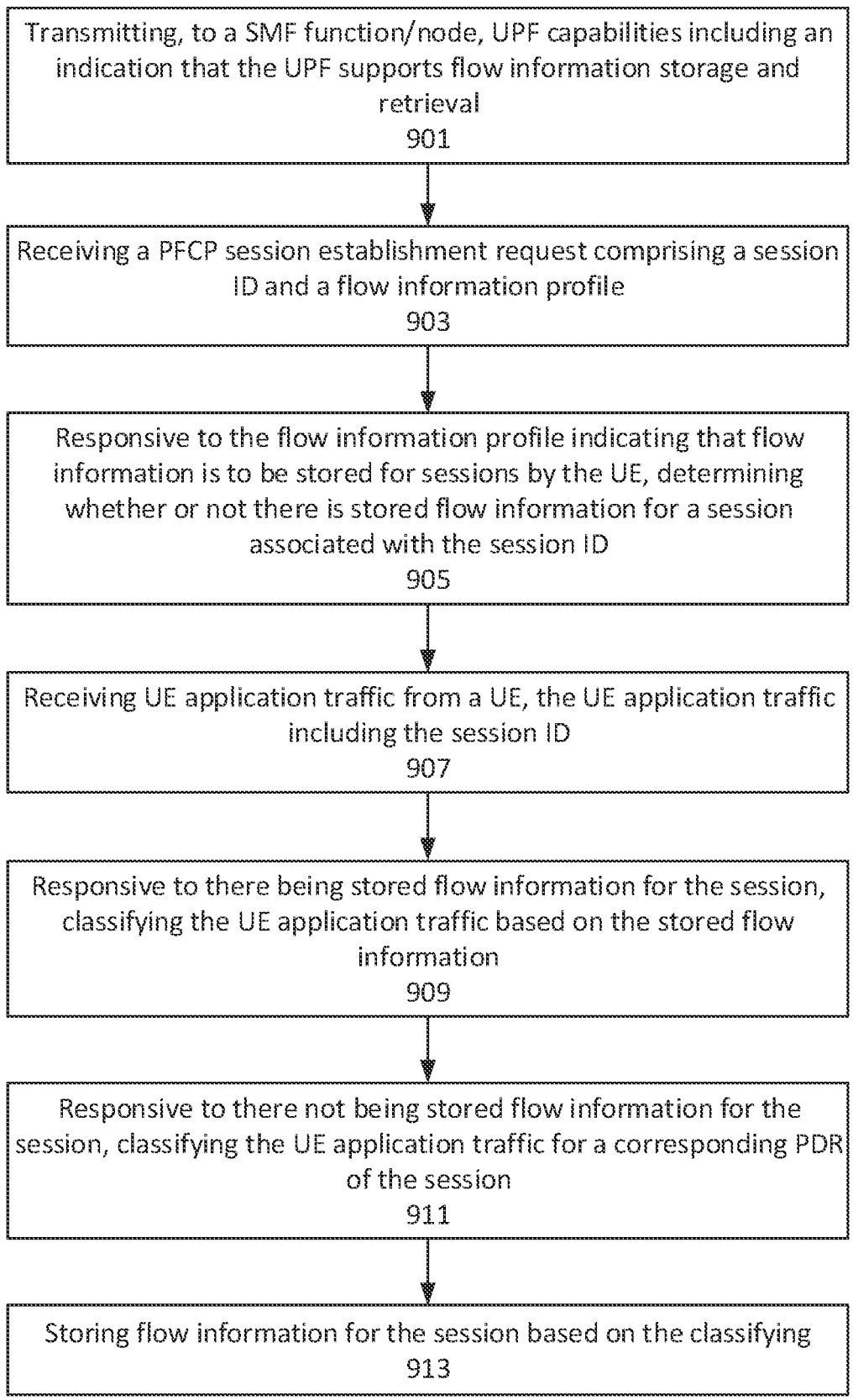
FIGS. 9-10 are flow charts illustrating operations of a UPF function/node according to some embodiments of inventive concepts.

Turning now to FIG. 9, in block 901, the processing circuitry 503 can transmit, to a session management function (SMF) function/node 116, UPF capabilities including an indication that the UPF 120 supports flow information storage and retrieval. For example, the processing circuitry 503 may use the UPF function features of Table 1 to indicate the capabilities.

In block 903, the processing circuitry 503 receives a packet flow control protocol (PFCP) session establishment request comprising a session identifier (ID) and a flow information profile.

Figure 10:
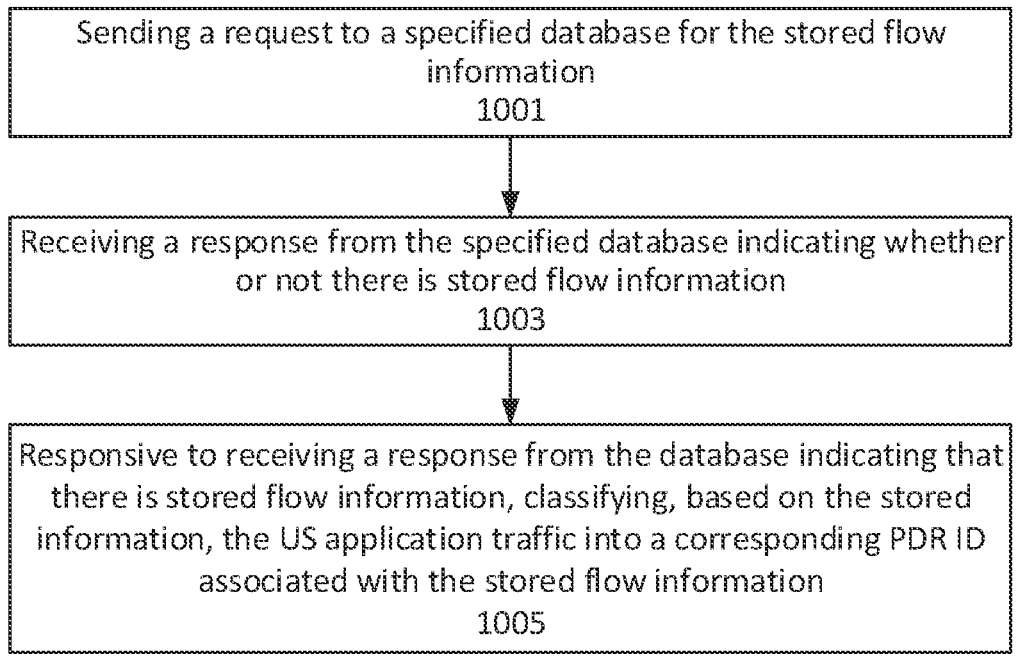

In block 905, the processing circuitry 503, responsive to the flow information profile indicating that flow information is to be stored for sessions by the UE, determines whether or not there is stored flow information for a session associated with the session ID. Turning to FIG. 10, in some embodiments of inventive concepts, the processing circuitry 503 determines whether or not there is stored flow information by sending, in block 1001, a request to a specified database for the stored flow information. In block 1003, the processing circuitry 503 receives a response from the specified database indicating whether or not there is stored flow information.

The response from the specified database may indicate whether flow information is to be applied to a specified application, to a group of subscribers, to a specified slice, on a per network node basis and/or on a network basis.

Returning to FIG. 9, in block 907, the processing circuitry 503 receives UE application traffic from a UE, the UE application traffic including the session ID. In block 909, the processing circuitry 503, responsive to there being stored flow information for the session, classifies the UE application traffic based on the stored flow information.

The processing circuitry 503, responsive to there not being stored flow information for the session, classifies the UE application traffic for a corresponding PDR of the session in block 911 and stores flow information for the session based on the classifying in block 913. The flow information in some embodiments in stored in the specified database.

Various operations from the flow chart of FIG. 9 may be optional with respect to some embodiments of communication devices and related methods. Regarding methods of example embodiments associated with claim 1 (set forth below), for example, operations of block 901 of FIG. 9 may be optional.

Operations of the SMF function/node 116 (implemented using the structure of the block diagram of FIG. 6) will now be discussed with reference to the flow chart of FIG. 11 according to some embodiments of inventive concepts. For example, modules may be stored in memory 605 of FIG. 6, and these modules may provide instructions so that when the instructions of a module are executed by respective communication device processing circuitry 603, processing circuitry 603 performs respective operations of the flow chart.

Figure 11:
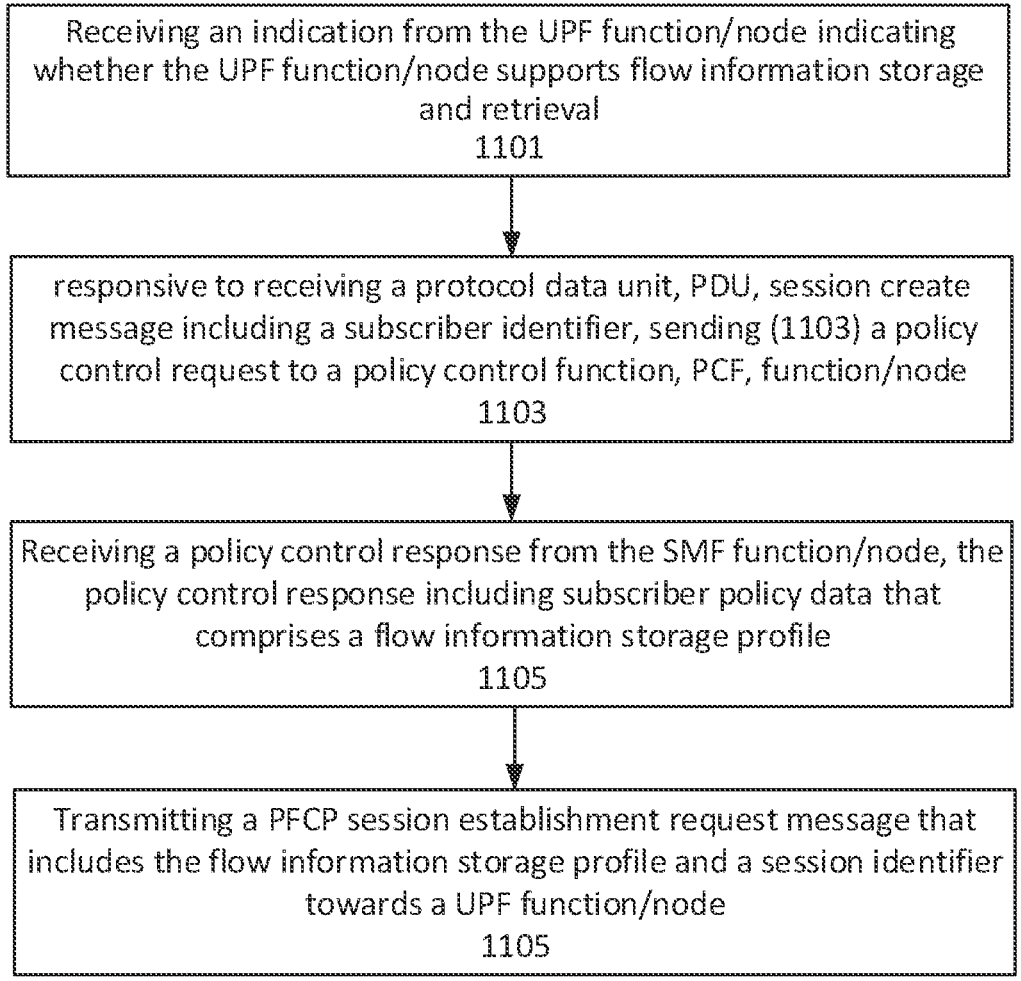
FIG. 11 is a flow chart illustrating operations of an SMF function/node according to some embodiments of inventive concepts.

Turning now to FIG. 11, the processing circuitry 603 in block 1101 receives an indication from a UPF function/node 120 indicating whether the UPF function/node 120 supports flow information storage and retrieval. The SMF 116 can uses this indication in deciding which UPF function/node to select for a UE session.

In block 1103, the processing circuitry 603 responsive to receiving a protocol data unit (PDU) session create message including a subscriber identifier, sends a policy control request to a policy control function (PCF) function/node 106.

In block 1105, the processing circuitry 603 receives a policy control response from the PCF function/node, the policy control response including subscriber policy data that includes a flow information storage profile.

In some embodiments of inventive concepts, receiving the subscriber policy includes receiving a flow information storage profile that specifies what flow information is to be stored. For example, receiving the flow information storage profile includes receiving one of a first profile that indicates that 5-tuple information and other information is to be stored, a second profile that indicates that only 5-tuple information is to be stored, or a third profile that indicates nothing is to be stored.

In other embodiments, receiving the policy control response further includes receiving an indication of whether the flow information storage policy is on a per subscriber basis, on a per application basis, on a group of subscriber basis, on a per node basis or on a network basis.

In block 1107, the processing circuitry 603 transmits a packet flow control protocol, PFCP, session establishment request message that includes the flow information storage profile and a session identifier towards a user plane function (UPF) function/node 120.

Various operations from the flow chart of FIG. 11 may be optional with respect to some embodiments of communication devices and related methods. Regarding methods of example embodiments associated with claim 17 (set forth below), for example, operations of block 1101 of FIG. 11 may be optional.

Operations of the database 200 (implemented using the structure of the block diagram of FIG. 8) will now be discussed with reference to the flow chart of FIG. 12 according to some embodiments of inventive concepts. For example, modules may be stored in memory 805 of FIG. 8, and these modules may provide instructions so that when the instructions of a module are executed by respective communication device processing circuitry 803, processing circuitry 803 performs respective operations of the flow chart.

Figure 12:
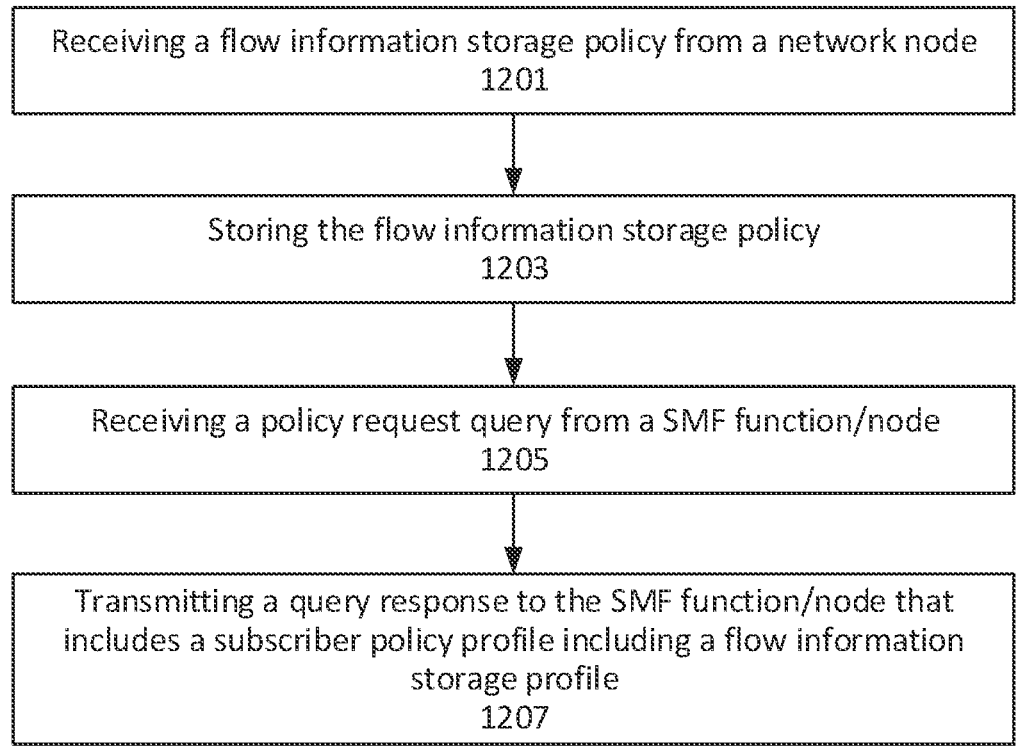
FIGS. 12-13 are flow charts illustrating operations of a database function/node according to some embodiments of inventive concepts.

Turning now to FIG. 12, in block 1201, the processing circuitry 803 receives a flow information storage policy from a network node. The network node can be a core network node controlled by a policy holder that sets policies including the flow information storage policy. In block 1203, the processing circuitry 803 stores the flow information storage policy.

In block 1205, the processing circuitry 803 receives a policy request query from a session management function (SMF) function/node 116. The processing circuitry 803 transmits a query response to the SMF function/node 116 that includes a subscriber policy profile including a flow information storage profile.

Various operations from the flow chart of FIG. 9 may be optional with respect to some embodiments of communication devices and related methods. Regarding methods of example embodiments associated with FIG. 12, for example, operations of blocks 1205 and 1207 of FIG. 12 may be optional.

Figure 13:
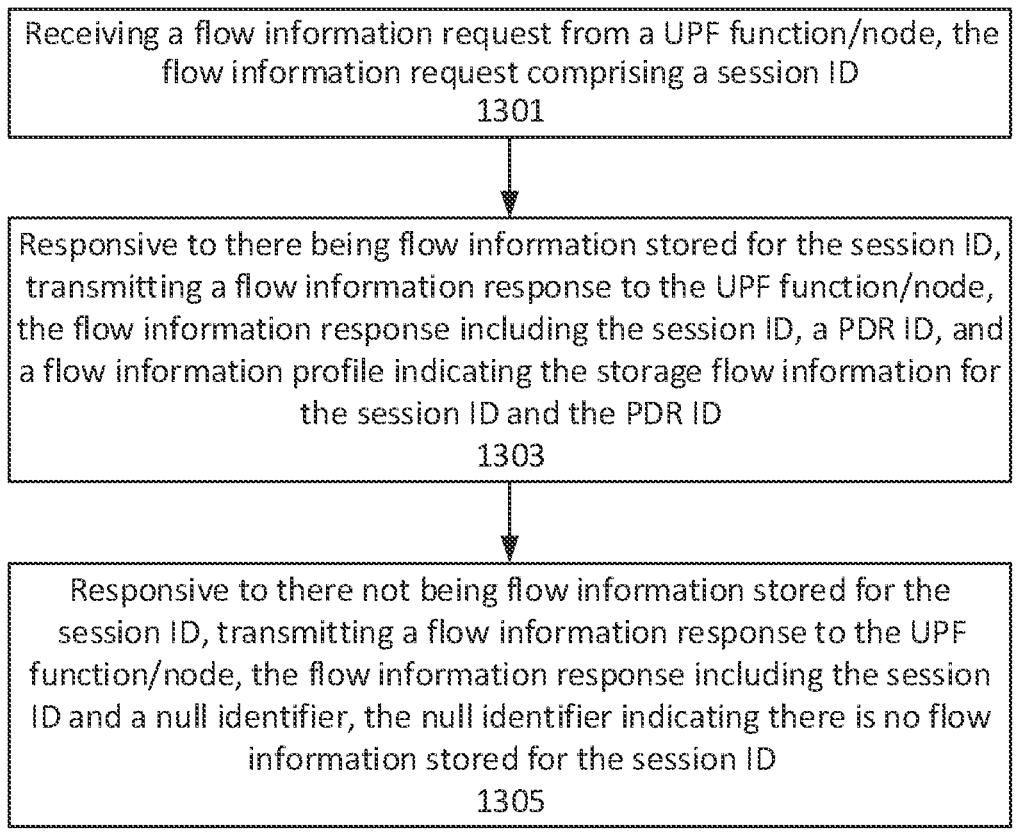

During operation, the database may be accessed to retrieve flow information storage profiles for various user sessions such as PDR session in order to classify flows. Turning now to FIG. 13, in block 1301, the processing circuitry 803 receives a flow information request from a user plane function (UPF) function/node 120, where the flow information request includes a session ID.

In block 1303, the processing circuitry 803, responsive to there being flow information stored for the session ID, transmits a flow information response to the UPF function/node 120, the flow information response including the session ID, a packet detection rule (PDR) identifier (ID), and a flow information profile indicating the storage flow information for the session ID and the PDR ID.

In block 1305, the processing circuitry 803, responsive to there not being flow information stored for the session ID, transmits a flow information response to the UPF function/node 120, the flow information response including the session ID and a null identifier, the null identifier indicating there is no flow information stored for the session ID.

Operations of the policy control function (PCF) function/node 106 (implemented using the structure of the block diagram of FIG. 7) will now be discussed with reference to the flow chart of FIG. 14 according to some embodiments of inventive concepts. For example, modules may be stored in memory 705 of FIG. 7, and these modules may provide instructions so that when the instructions of a module are executed by respective communication device processing circuitry 703, processing circuitry 703 performs respective operations of the flow chart.

Figure 14:
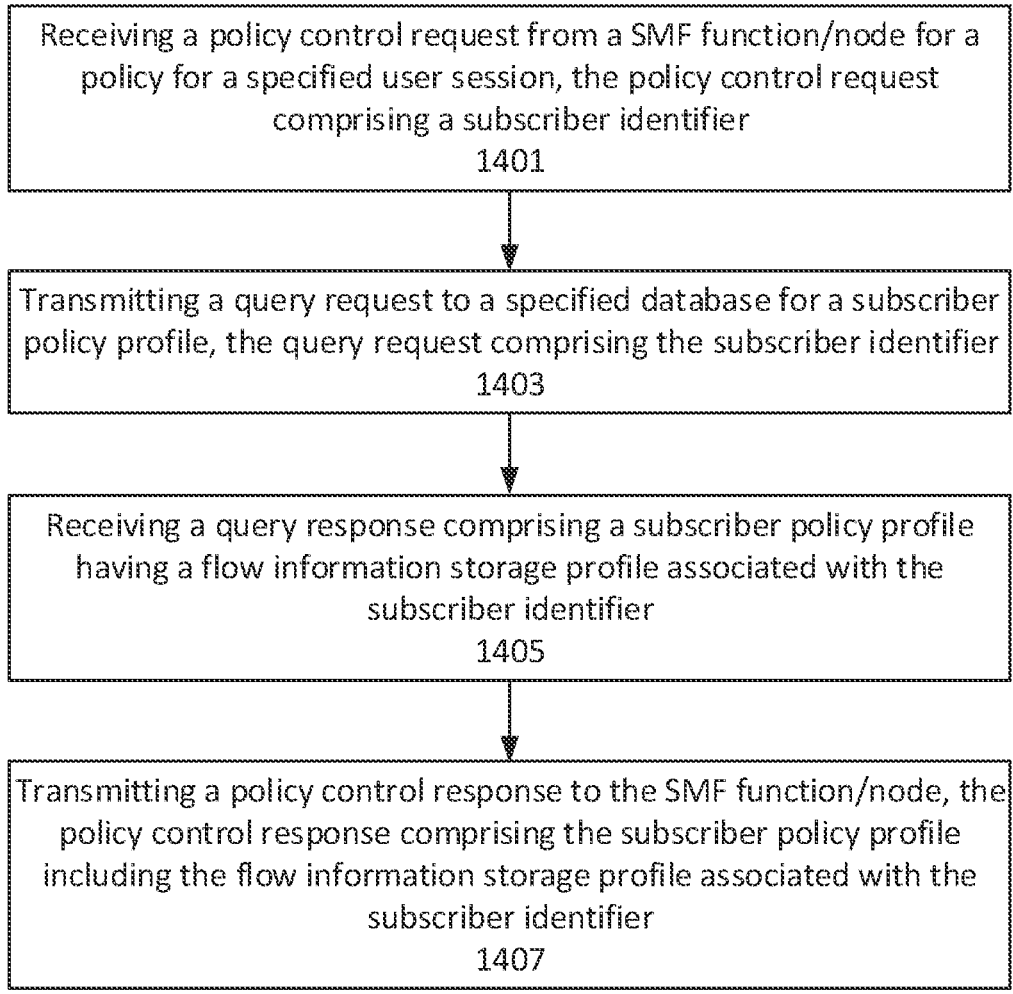
FIG. 14 is a flow chart illustrating operations of an SMF function/node according to some embodiments of inventive concepts.

Turning now to FIG. 14, in block 1401, the processing circuitry 703 receives a policy control request from a session management function (SMF) function/node 116 for a policy for a specified user session, the policy control request including a subscriber identifier.

In block 1403, the processing circuitry 703 transmits a query request to a specified database for a subscriber policy profile, the query request including the subscriber identifier. In block 1405, the processing circuitry 703 receives a query response including the subscriber policy profile having the flow information storage profile associated with the subscriber identifier.

In block 1407, the processing circuitry 703 transmits a policy control response to the SMF function/node 116, the policy control response comprising a subscriber policy profile including a flow information storage profile associated with the subscriber identifier.

Explanations are provided below for various abbreviations/acronyms used in the present disclosure.

Abbreviation Explanation

AMF Access and Mobility Management Function
CDR Call Detail Record
CUPS Control and User Plane Split
DL Downlink
IE Information Element
FAR Forwarding Action Rule
GPSI Global Public Subscriber Identifier
NR Next Generation Radio/New Radio
PCF Policy Control Function
PCRF Policy Control Rules Function
PDR Packet Detection Rule
PDU Protocol Data Unit
PFCP Packet Flow Control Protocol
PGW Packet Gateway
PGW-C PDN Gateway Control plane function
PGW-U PDN Gateway User plane function
QER QOS Enforcement Rule
QoS Quality of Service
SMF Session Management Function
SNI Server Name Indication
UDR Unified Data Repository
UL Uplink
UPF User Plane Function
URI Uniform Resource Identifier
URL Uniform Resource Locator
URR Usage Reporting Rule
References are identified below.
1. 3GPP TS 29.244 v16.1.0 (September 2019): Interface between the Control Plane and the User Plane nodes Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method to classify traffic of a user equipment (UE) by a user plane function (UPF) in a network node, the method comprising:
   receiving a packet flow control protocol (PFCP) session establishment request comprising a session identifier (ID) and a flow information profile;
   responsive to the flow information profile indicating that flow information is to be stored for sessions by the UE, determining whether or not there is stored flow information for a session associated with the session ID;
   receiving UE application traffic from a UE, the UE application traffic including the session ID;
   responsive to there being stored flow information for the session, classifying the UE application traffic based on the stored flow information; and
   responsive to there not being stored flow information for the session:
      classifying the UE application traffic for a corresponding packet detection rule (PDR) of the session; and
      storing flow information for the session based on the classifying.

2. The method of claim 1, wherein determining whether or not there is stored flow information for the session associated with the session ID comprises:
   sending a request to a specified database for the stored flow information; and
   receiving a response from the specified database indicating whether or not there is stored flow information.

3. The method of claim 2, further comprising:
   responsive to receiving a response from the specified database indicating that there is stored flow information, classifying, based on the stored information, the UE application traffic into a corresponding packet detection rule (PDR) identifier (ID) associated with the stored flow information.

4. The method of claim 2, wherein receiving the response comprises receiving a response indicating whether flow information is to be applied to a specified application, to a group of subscribers, to a specified slice, on a per network node basis and/or on a network basis.

5. The method of claim 2, wherein storing the flow information comprises storing the flow information in the specified database.

6. The method of claim 1, further comprising:
   transmitting, to a session management function (SMF) function/node, UPF capabilities including an indication that the UPF supports flow information storage and retrieval.

7. A user plane function (UPF) function/node comprising:
   processing circuitry; and
   memory coupled with the processing circuitry, wherein the memory includes instructions that when executed by the processing circuitry causes the UPF function/node to perform operations comprising:
      receive a packet flow control protocol (PFCP) session establishment request comprising a session identifier (ID) and a flow information profile;
      responsive to the flow information profile indicating that flow information is to be stored for sessions by the UE, determine whether or not there is stored flow information for a session associated with the session ID;
      receive user equipment (UE) application traffic from a UE, the UE application traffic including the session ID;
      responsive to there being stored flow information for the session, classify the UE application traffic based on the stored flow information; and
      responsive to there not being stored flow information for the session:
         classify the UE application traffic for a corresponding packet detection rule (PDR) of the session; and
         store flow information for the session based on the classifying.

8. The UPF function/node of claim 7, wherein determine whether or not there is stored flow information for the session associated with the session ID comprises:
  send a request to a specified database for the stored flow information; and
  receive a response from the specified database indicating whether or not there is stored flow information.

9. The UPF function/node of claim 8, wherein the memory includes further instructions that when executed by the processing circuitry causes the UPF function/node to perform operations further comprising:
  responsive to receiving a response from the specified database indicating that there is stored flow information, classify, based on the stored information, the UE application traffic into a corresponding packet detection rule (PDR) identifier (ID) associated with the stored flow information.

10. The UPF function/node of claim 8, wherein receive the response comprises receive a response indicating whether flow information is to be applied to a specified application, to a group of subscribers, to a specified slice, on a per network node basis and/or on a network basis.

11. The UPF function/node of claim 7, wherein store the flow information comprises store the flow information in the specified database.

12. The UPF function/node of claim 7, wherein the memory includes further instructions that when executed by the processing circuitry causes the UPF function/node to perform operations further comprising:
  transmit, to a session management function (SMF) function/node, UPF capabilities including an indication that the UPF supports flow information storage and retrieval.

13. A method performed by a session management function (SMF) function/node in a communication network, the method comprising:
  responsive to receiving a protocol data unit (PDU) session create message including a subscriber identifier, sending a policy control request to a policy control function (PCF) function/node;
  receiving a policy control response from the PCF function/node, the policy control response including subscriber policy data that comprises a flow information storage profile; and
  transmitting a packet flow control protocol (PFCP) session establishment request message that includes the flow information storage profile and a session identifier towards a user plane function (UPF) function/node.

14. The method of claim 13, wherein receiving the subscriber policy data comprises receiving a flow information storage profile that specifies what flow information is to be stored.

15. The method of claim 14, wherein receiving the flow information storage profile includes receiving one of a first profile that indicates that 5-tuple information and other information is to be stored, a second profile that indicates that only 5-tuple information is to be stored, or a third profile that indicates nothing is to be stored.

16. The method of claim 13, wherein receiving the policy control response further comprises receiving an indication of whether the flow information storage policy is on a per subscriber basis, on a per application basis, on a group of subscriber basis, on a per node basis or on a network basis.

17. The method of claim 15, further comprising receiving an indication from the UPF function/node indicating whether the UPF function/node supports flow information storage and retrieval.

18. A session management function (SMF) function/node comprising:
  processing circuitry; and
  memory coupled with the processing circuitry, wherein the memory includes instructions that when executed by the processing circuitry causes the SMF function/node to perform operations comprising:
    responsive to receiving a protocol data unit (PDU) session create message including a subscriber identifier, send a policy control request to a policy control function (PCF) function/node;
    receive a policy control response from the PCF function/node, the policy control response including subscriber policy data that comprises a flow information storage profile; and
    transmit a packet flow control protocol (PFCP) session establishment request message that includes the flow information storage profile and a session identifier towards a user plane function (UPF) function/node.

19. The SMF function/node of claim 18, wherein receive the policy control response further comprises receive an indication of whether the flow information storage policy is on a per subscriber basis, on a per application basis, on a group of subscriber basis, on a per node basis or on a network basis.

20. The SMF function/node of claim 18, wherein the memory includes instructions that when executed by the processing circuitry causes the SMF function/node to perform operations further comprising receive an indication from the UPF function/node indicating whether the UPF function/node supports flow information storage and retrieval.

* * * * *